(12) United States Patent
Chen (10) Patent No.: US 11,366,335 B2
(45) Date of Patent: Jun. 21, 2022

(54) WEARABLE DEVICE AND 3D DISPLAY SYSTEM AND METHOD

(71) Applicants: HKC Corporation Limited, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Guangdong (CN); Chongqing HKC Optoelectronics Technology Co., Ltd., Chongqing (CN)

(*) Notice: Subject to any disclaimer, the term of this patent is extended or adjusted under 35 U.S.C. 154(b) by 301 days.

(21) Appl. No.: 16/628,395

(22) PCT Filed: Aug. 31, 2017

(86) PCT No.: PCT/CN2017/099939
§ 371 (c)(1),
(2) Date: Jan. 3, 2020

(87) PCT Pub. No.: WO2019/006843
PCT Pub. Date: Jan. 10, 2019

(65) Prior Publication Data
US 2020/0218061 A1 Jul. 9, 2020

(30) Foreign Application Priority Data
Jul. 6, 2017 (CN) .................. 201710547485.X (51) Int. Cl.
*G02B 30/25* (2020.01)
*G02B 26/08* (2006.01)

(52) U.S. Cl.
CPC ......... *G02B 30/25* (2020.01); *G02B 26/0875* (2013.01)

(58) Field of Classification Search
CPC .. G02B 30/25; G02B 26/0875; G02B 27/017; G02B 2027/0178; G02B 3/0081;
(Continued)

(56) References Cited

U.S. PATENT DOCUMENTS 10,466,391 B2 * 11/2019 Yadin .................. G02B 3/10
2016/0179193 A1 * 6/2016 Du ...................... G02B 27/017
345/633

FOREIGN PATENT DOCUMENTS

CN 202904146 U 4/2013
CN 103885194 A 6/2014
(Continued)

*Primary Examiner* — Jade R Chwasz
(74) *Attorney, Agent, or Firm* — Muncy, Geissler, Olds & Lowe, P.C.

(57) ABSTRACT

A wearable device, a 3D display system, and a 3D image displaying method are provided. The 3D image displaying method includes acquiring a curvature information of the 3D display device when the 3D display device is turned on; adjusting a curvature of the wearable device according to the curvature information; determining whether an adjusted curvature of the wearable device and a curvature of the 3D display device satisfy a predetermined relationship; and sending a control signal to the 3D display device to control the 3D display device to display a 3D image when the adjusted curvature of the wearable device and the curvature of the 3D display device satisfy the predetermined relationship.

6 Claims, 7 Drawing Sheets

(58) Field of Classification Search
CPC .. G02B 2003/0093; G02B 3/14; G02B 26/08; G02B 27/0172; G02B 27/0176; G02B 27/0012; G02B 27/0075; G02B 30/20; G02B 30/22; G02B 30/02; G02B 30/36
USPC ....... 359/466, 465, 462, 694, 666, 315, 319; 351/55
See application file for complete search history.

(56) References Cited

FOREIGN PATENT DOCUMENTS

| | | |
|---|---|---|
| CN | 105892073 A | 8/2016 |
| CN | 106291975 A | 1/2017 |
| JP | 2011154144 A | 8/2011 |
| WO | WO2005088388 A1 | 9/2005 |

\* cited by examiner

WEARABLE DEVICE AND 3D DISPLAY SYSTEM AND METHOD

BACKGROUND

Technology Field

This disclosure relates to a technical field of a display, and more particularly to a wearable device and 3D display system and method.

Description of Related Art

At present, more and more displays can display a stereoscopic image. The 3D display technology includes an eyeglass-type (stereoscopic type) display and a naked-eye-type display. In addition, because the curved surface display technology provides different experiences for the user, it has gradually become a new development direction. Hence, the new design of the polarized stereoscopic display device using a curved screen has become a hot point of the current research. In the polarized stereoscopic display, the structural design of the polarized glasses directly affects the viewing results, and the problem of crosstalk frequently appears. In the polarized stereoscopic display device with a curved screen, the problem of crosstalk is particularly present. The problem of crosstalk seriously affects the user's viewing experience, and causes the user to feel dizzy when it becomes serious.

SUMMARY

An embodiment of this disclosure provides a wearable device and 3D display system and method to improve the problem of crosstalk of the existing stereoscopic display.

In an aspect, this disclosure provides a wearable device to be used with a 3D display device to display a stereoscopic image, the wearable device comprises a wearable body, a control circuitry, an adjusting assembly, and at least one lens. The control circuitry is disposed in the wearable body; the adjusting assembly is disposed on the wearable body, and electrically connected to the control circuitry; the lens is mounted on the wearable body; wherein the control circuitry is configured to control the adjusting assembly to adjust a curvature of the lens according to curvature information of the 3D display device, so that the curvature of the lens and a curvature of the 3D display device satisfy a predetermined relationship.

In another aspect, this disclosure also provides a 3D display system, comprising a 3D display device, and a wearable device. The wearable device comprises a wearable body and at least one lens mounted on the wearable body, and a curvature of the lens and a curvature of the 3D display device satisfy a predetermined relationship.

In another aspect, this disclosure provides a 3D image displaying method applied to a 3D display system, the 3D display system comprising a wearable device and a 3D display device, the 3D image displaying method comprising: acquiring curvature information of the 3D display device when the 3D display device is turned on; adjusting a curvature of the wearable device according to the curvature information; determining whether an adjusted curvature of the wearable device and a curvature of the 3D display device satisfy a predetermined relationship; and sending a control signal to the 3D display device to control the 3D display device to display a 3D image when the adjusted curvature of the wearable device and the curvature of the 3D display device satisfy the predetermined relationship.

This disclosure is through acquiring curvature information of the 3D display device when the 3D display device is turned on; adjusting a curvature of the wearable device according to the curvature information; determining whether an adjusted curvature of the wearable device and a curvature of the 3D display device satisfy a predetermined relationship; and sending a control signal to the 3D display device to control the 3D display device to display a 3D image when the adjusted curvature of the wearable device and the curvature of the 3D display device satisfy the predetermined relationship. With such the 3D display device used with the wearable device which both have matched curvatures, the problem of crosstalk of the stereoscopic display at a large viewing angle can be effectively solved, and the user's viewing experience can be thus enhanced.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

Figure 1:
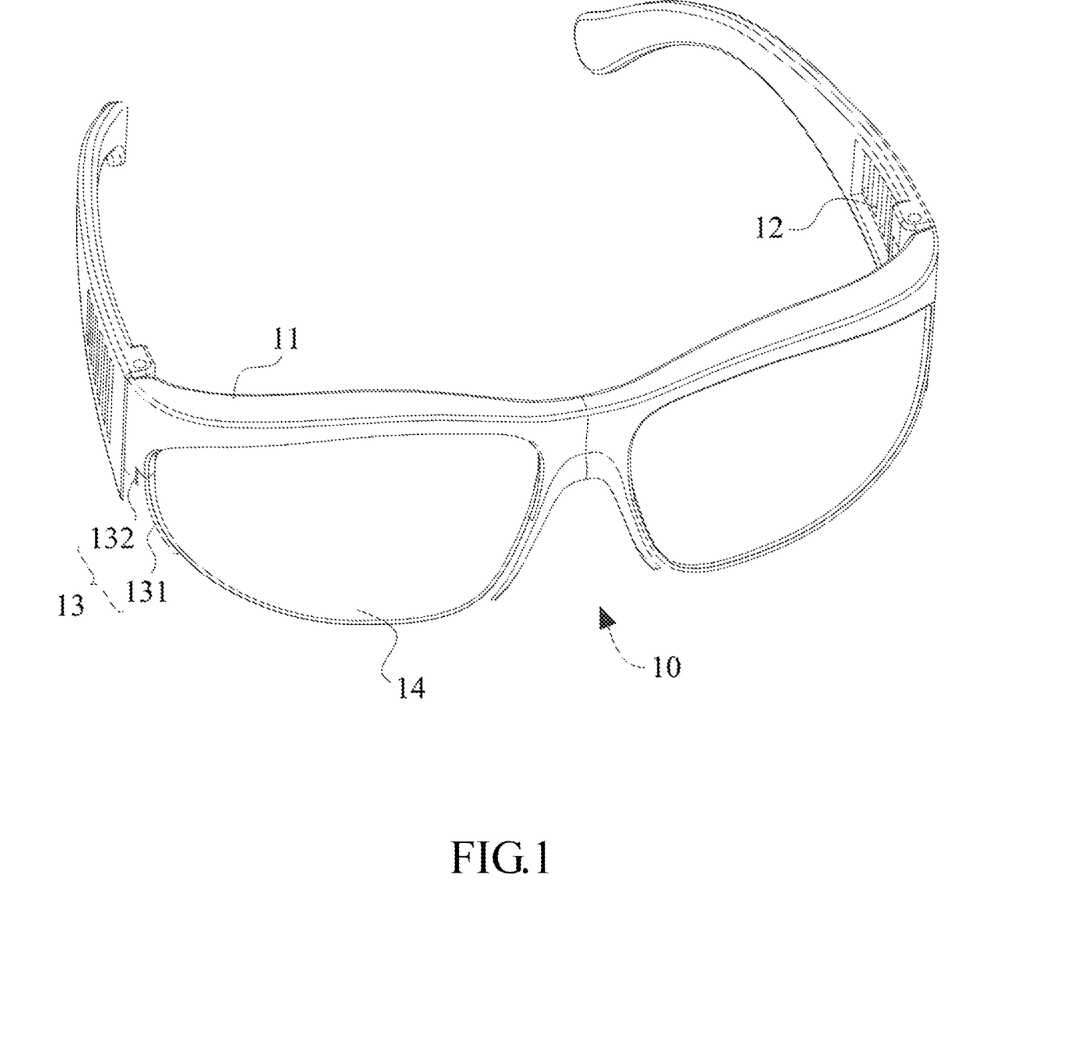
FIG. 1 is a schematic structure view showing a wearable device provided by the embodiment of this disclosure.

Referring to FIG. 1, it is a schematic structure view showing a wearable device provided by the embodiment of this disclosure. In detail, the wearable device is a pair of 3D polarized glasses to be used with a 3D display device to constitute a 3D display system through which the user can watch the 3D video. The 3D display system can provide the better 3D video viewing experience for the user. As shown in FIG. 1, the wearable device 10 comprises a wearable body 11, a control circuitry 12, an adjusting assembly 13, and at least one lens 14, and the lens 14 is a polarizer, in detail, a soft polarizer whose curvature may be adjusted. The amount of the lenses 14 is two. The polarizing direction of each lens 14 is perpendicular to each other.

In this embodiment, a wearable body 11 is provided to facilitate the wearing. In detail, the wearable body 11 is a housing, and the specific structure of the housing may be understood as the main body of frame of the glasses. In detail, a control circuitry 12 may be integrated on a printed circuit board, and the printed circuit board is mounted inside the wearable body 11.

In this embodiment, the adjusting assembly 13 is disposed on the wearable body 11, and electrically connected to the control circuitry 12. The control circuitry 12 is configured to and can control the adjusting assembly 13 to adjust a curvature of the lens 14. Specifically, the adjusting assembly 13 comprises an adjusting frame 131 and an actuator 132. The adjusting frame 131 rests against one end of the lens 14. The actuator 132 is securely connected to the adjusting frame 131, and drives the adjusting frame 131 to squeeze or relax the lens 14 to adjust the curvature of the lens 14.

In an embodiment of this disclosure, the curvature adjustment of the lens 14 of a wearable device 10 is specifically adjusted according to the curvature information of the 3D display device. Specifically, the control circuitry 12 receives the curvature information of the 3D display device, and controls an adjusting assembly 13 to adjust a curvature of the lens 14 according to the curvature information, so that the curvature of the lens 14 and the curvature of the 3D display device satisfy a predetermined relationship. For example, the curvature of the lens 14 and the curvature of the 3D display device are the same.

Figure 2:
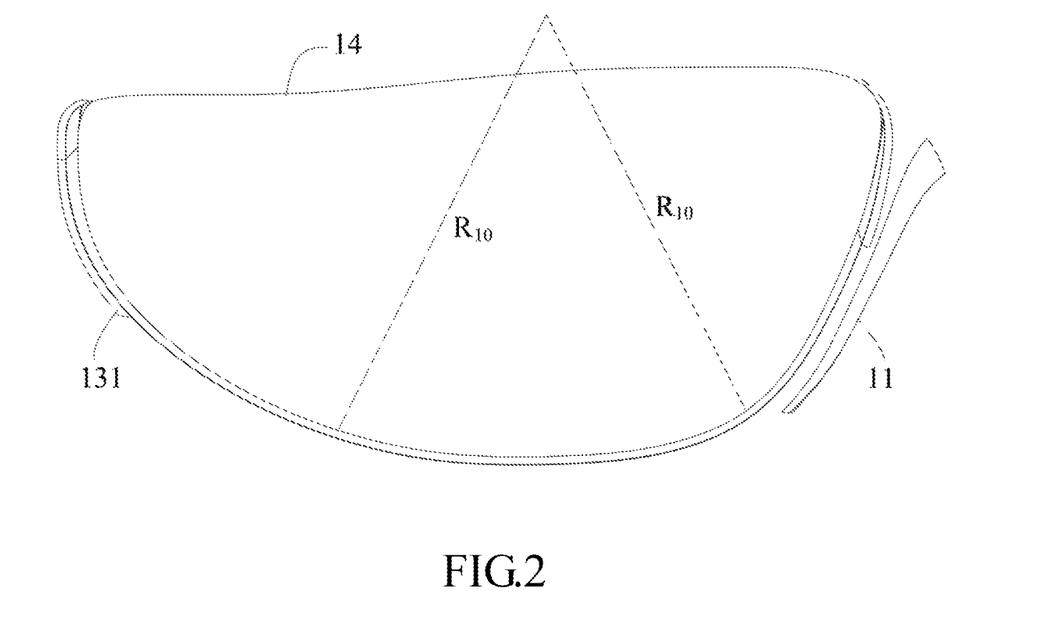
FIG. 2 is a schematic structure view showing a lens of the wearable device provided by the embodiment of this disclosure.

In an embodiment of this disclosure, as shown in FIG. 2, when the control circuitry 12 controls an actuator 132 to drive an adjusting frame 131 to squeeze the lens 14, the radius of curvature R10 of the lens 14 becomes smaller. When the control circuitry 12 controls the actuator 132 to drive the adjusting frame 131 to relax the lens 14, the lens 14 resumes forced by its tension, and the radius of curvature R10 of the lens 14 becomes larger. Thus, the curvature of the lens 14 of the wearable device 10 can be adjusted according to this principle, so that the curvature of the lens 14 and the curvature of the 3D display device satisfy the predetermined relationship. Therefore, the phase delays of the stereoscopic images through the 3D display device and the wearing device are the same or similar, the problem of crosstalk of the 3D display at the large viewing angle can be thus effectively solved, and the user's video viewing experience can be thus enhanced.

In an embodiment of this disclosure, the adjusting frame 131 is provided with a groove (not shown), and the groove is used to mount an end portion of the lens 14. In other words, it is to fix the lens 14. The lens 14 is prevented from loosening during squeezing or relaxing.

In some embodiment, the 3D display device may be, for example, a liquid crystal stereoscopic curved display device, an OLED stereoscopic curved display device, a QLED stereoscopic curved display device, or other types of the stereoscopic curved surface display device.

Figure 3:
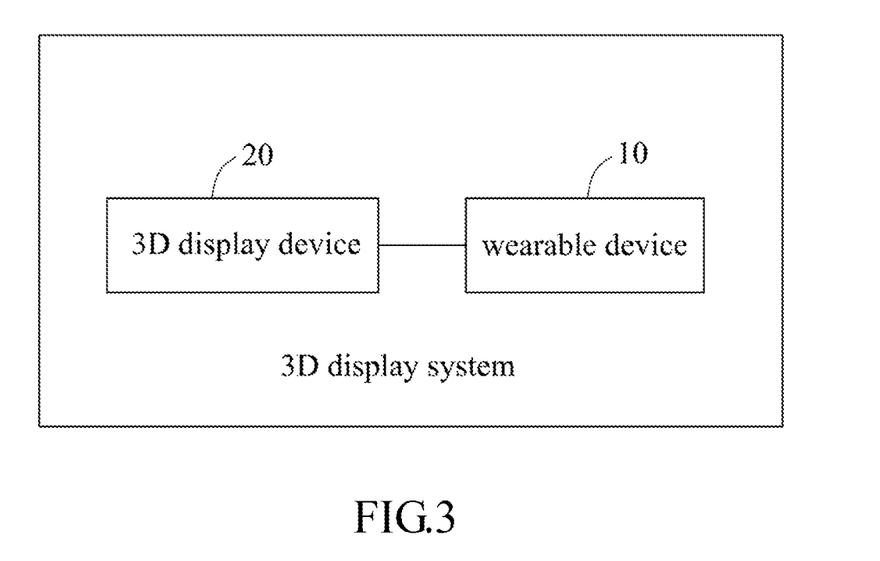
FIG. 3 is a schematic block diagram showing a 3D display system provided by the embodiment of this disclosure.

Referring to FIG. 3, it is a schematic block diagram showing a 3D display system provided by the embodiment of this disclosure. As shown in FIG. 3, the 3D display system includes the wearable device 10 and a 3D display device 20. The wearable device 10 may be, for example, the polarized glasses, and includes a wearable body and at least one lens. The lens is mounted on the wearable body, and a curvature of the lens and a curvature of the 3D display device satisfy a predetermined relationship. The term "satisfying the predetermined relationship" may be, for example, equal, similar or the like. The curvature of the lens and the curvature of the 3D display device satisfying the predetermined relationship can decrease the problem of crosstalk when the stereoscopic images are displayed, and the user's video viewing experience is thus enhanced.

In this embodiment, the wearable device may be the wearable device having the adjustable curvature in the above-mentioned embodiment, and may also be the wearable device with a constant curvature.

In this embodiment, in order to overcome the problem of crosstalk during displaying the stereoscopic images, the curvature of the lens and the curvature of the 3D display device are the same.

Figure 4:
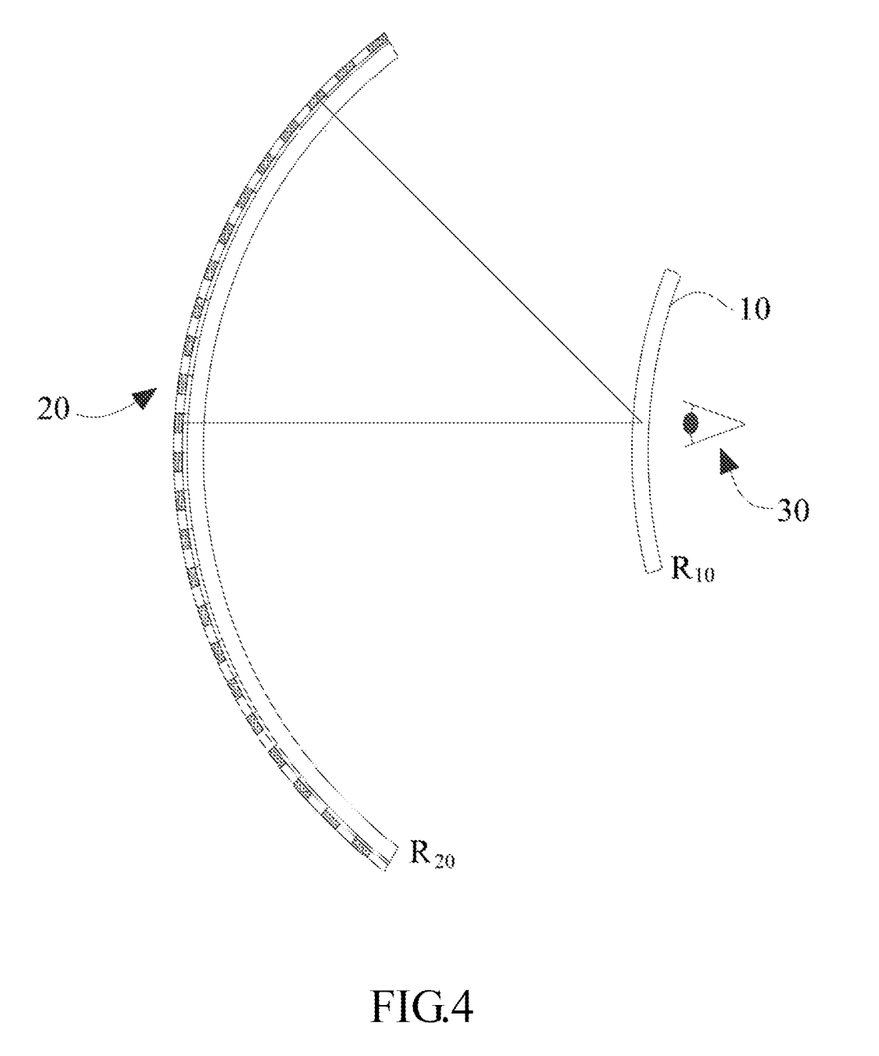
FIG. 4 is a schematic structure view showing a 3D display system provided by the embodiment of this disclosure.

In this embodiment, as shown in FIG. 4, the 3D display system includes the wearable device 10 and the 3D display device 20, and the curvature $R_{10}$ of the wearable device 10 and the curvature $R_{20}$ of the 3D display device 20 are the same. After the 3D images displayed by the 3D display device 20 passes through the wearable device 10 and then reaches the eyes 30 of the user, the problem of crosstalk of the 3D display at the large viewing angle can be thus effectively solved, and the user's video viewing experience can be thus enhanced because the phase delays generated through the 3D display device 20 and the wearable device 10 are the same or similar.

Figure 5:
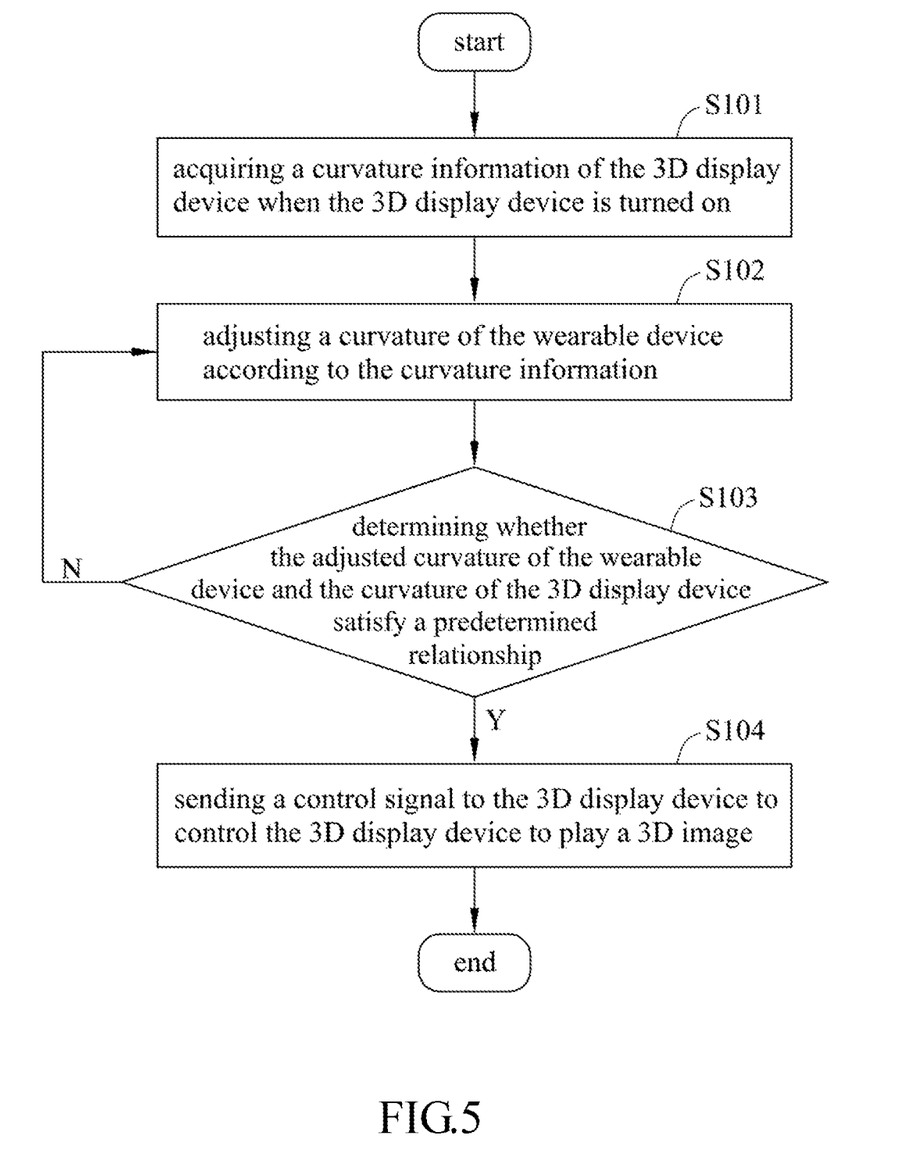
FIG. 5 is a schematic flow chart showing a 3D image displaying method provided by the embodiment of this disclosure.

Referring to FIG. 5, it is a schematic flow chart showing a 3D image displaying method provided by the embodiment of this disclosure. The 3D image displaying method is applied to the 3D display system, and the 3D display system includes the wearable device and the 3D display device. The wearable device may be, for example, polarized 3D glasses. The 3D display device may be, for example, a stereoscopic curved display device, and the curvature is adjustable. The wearable device and the 3D display device establish a wireless communication connection therebetween to constitute the 3D display system, and the 3D display system is used to display 3D images. As shown in FIG. 5, the 3D image displaying method includes steps S101 to S104.

In the step S101, when the 3D display device is turned on, a curvature information of the 3D display device is acquired.

In an embodiment of this disclosure, the term "when the 3D display device is turned on", specifically, may be when the 3D display device is turned on and ready to display the stereoscopic image. The stereoscopic image may be, for example, a 3D movie or video and the like. After the 3D display device is booted up, the wearable device and the 3D display device establish a wireless communication connection therebetween, such as a WIFI connection, a Bluetooth connection or the like. After the connection is established, the wearable device receives the curvature information of the 3D display device, and the curvature information includes a specific value of the curvature the 3D display device.

It is to be noted that the curvature information of the 3D display device may be pre-stored, or, when the curvature of the 3D display device changes, the 3D display device may sense and acquire the changed curvature information.

In the step S102, the curvature of the wearable device is adjusted according to the curvature information.

In an embodiment of this disclosure, the curvature of the wearable device is adjusted according to the curvature of the 3D display device. Specifically, the curvature value of the lens of the wearable device is adjusted. Hence, the curvature of the wearable device and the curvature of the 3D display device match each other.

Said adjusting includes, but not being limited to, an automatic adjustment method and a manual adjustment method. The automatic adjustment method is that the wearable device adjusts the curvature value of its own lens according to the curvature information. The manual adjustment method is that the curvature information is presented to the user, and the user manually adjusts the curvature value of the lens of wearable device according to the curvature information.

Figure 6:
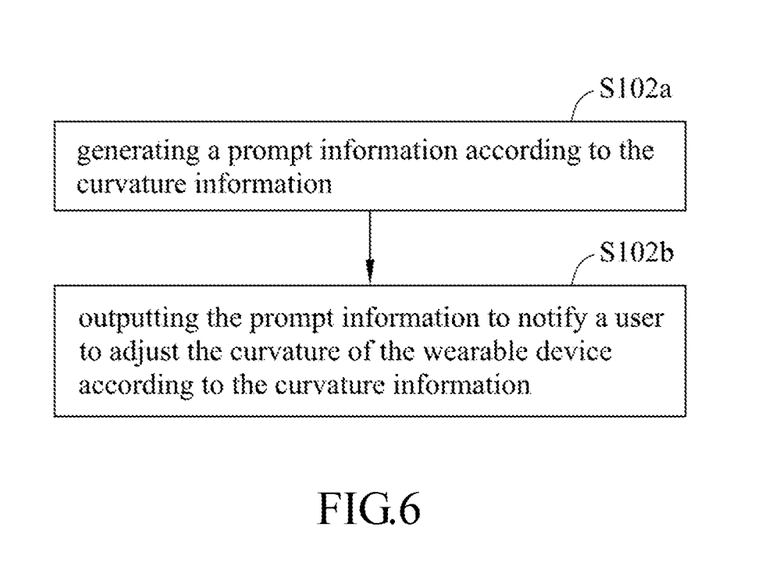
FIG. 6 is a schematic flow chart showing sub-steps of the step S102 in FIG. 5.

The wearable device is provided with a manual adjusting knob and a screen to help the user to do the manual adjustment. As shown in FIG. 6, the manual adjustment method comprises step S102*a* and step S102*b*. In the step S102*a*, a prompt information is generated according to the curvature information. In the step S102*b*, the prompt information is output to notify a user to adjust the curvature of the wearable device according to the curvature information. Specifically, the prompt information is displayed through the screen, and the user adjusts the curvature of the wearable device through the adjusting knob after seeing the prompt information.

In the step S103, it is to determine whether an adjusted curvature of the wearable device and the curvature of the 3D display device satisfy a predetermined relationship.

In an embodiment of this disclosure, the predetermined relationship means that the curvature of the wearable device and the curvature of the 3D display device satisfy the predetermined condition, such as, the condition corresponding to the predetermined range, or the condition where both of them are the same. When the wearable device determines that the adjusted curvature of the wearable device and the curvature of the 3D display device satisfy the predetermined relationship, step S104 is then performed. When the wearable device determines that the adjusted curvature of the wearable device and the curvature of the 3D display device do not satisfy the predetermined relationship, step S102 is then performed, to continue to adjust the curvature of the wearable device, until the curvature of the wearable device satisfies the predetermined relationship.

Figure 7:
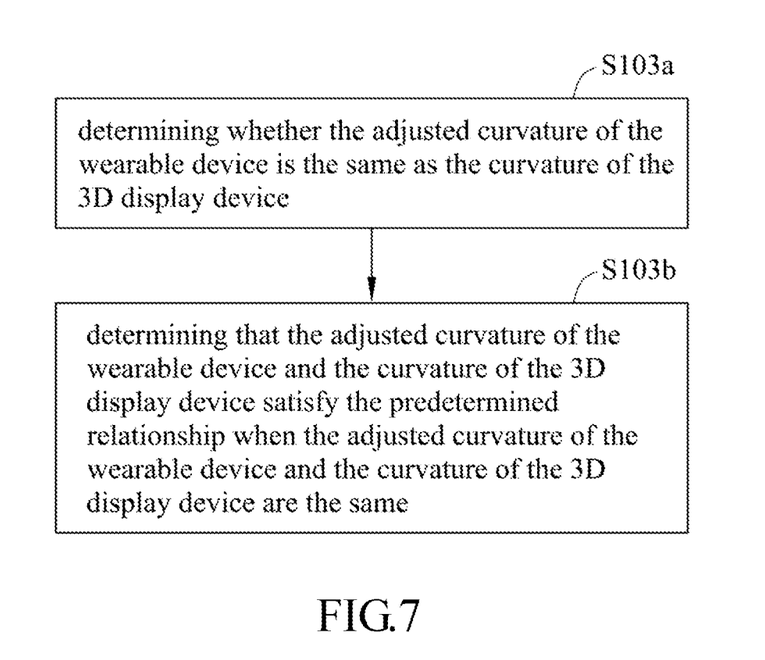
FIG. 7 is a schematic flow chart showing sub-steps of the step S103 in FIG. 5.

As shown in FIG. 7, the step S103 of determining whether the predetermined relationship is satisfied includes steps S103*a* and S103*b*. In the step S103*a*, it is to determine whether the adjusted curvature of the wearable device is the same as the curvature of the 3D display device. In the step S103*b*, when the adjusted curvature of the wearable device and the curvature of the 3D display device are the same, then the adjusted curvature of the wearable device and the curvature of the 3D display device are determined to be satisfied the predetermined relationship. Specifically, the adjusted curvature of the wearable device and the curvature of the 3D display device are the same, that is, are equal to each other.

In the step S104, a control signal is sent to the 3D display device to control the 3D display device to display the stereoscopic image.

In an embodiment of this disclosure, after the control signal is generated by the wearable device, the control signal is sent to the 3D display device, and the 3D display device controls it to display the stereoscopic image according to the control signal. Hence, the user views the 3D image, such as a 3D movie, through the 3D display device and the wearable device.

Specifically, referring to FIG. 4, it is a schematic structure view showing a 3D display system provided by the embodiment of this disclosure. As shown in FIG. 4, the 3D display system includes the wearable device 10 and the 3D display device 20. After the adjustment is performed according to the method in the above-mentioned embodiment, it is ensured that the curvature $R_{10}$ of the wearable device 10 and the curvature $R_{20}$ of the 3D display device 20 are the same. After the 3D image displayed by the 3D display device 20 passes through the wearable device 10 and then reaches the eyes 30 of the user, the problem of crosstalk of the stereoscopic display at the large viewing angle can be thus effectively solved, and the user's video viewing experience can be thus enhanced because the phase delays generated through the 3D display device 20 and the wearable device 10 are the same or similar.

Figure 8:
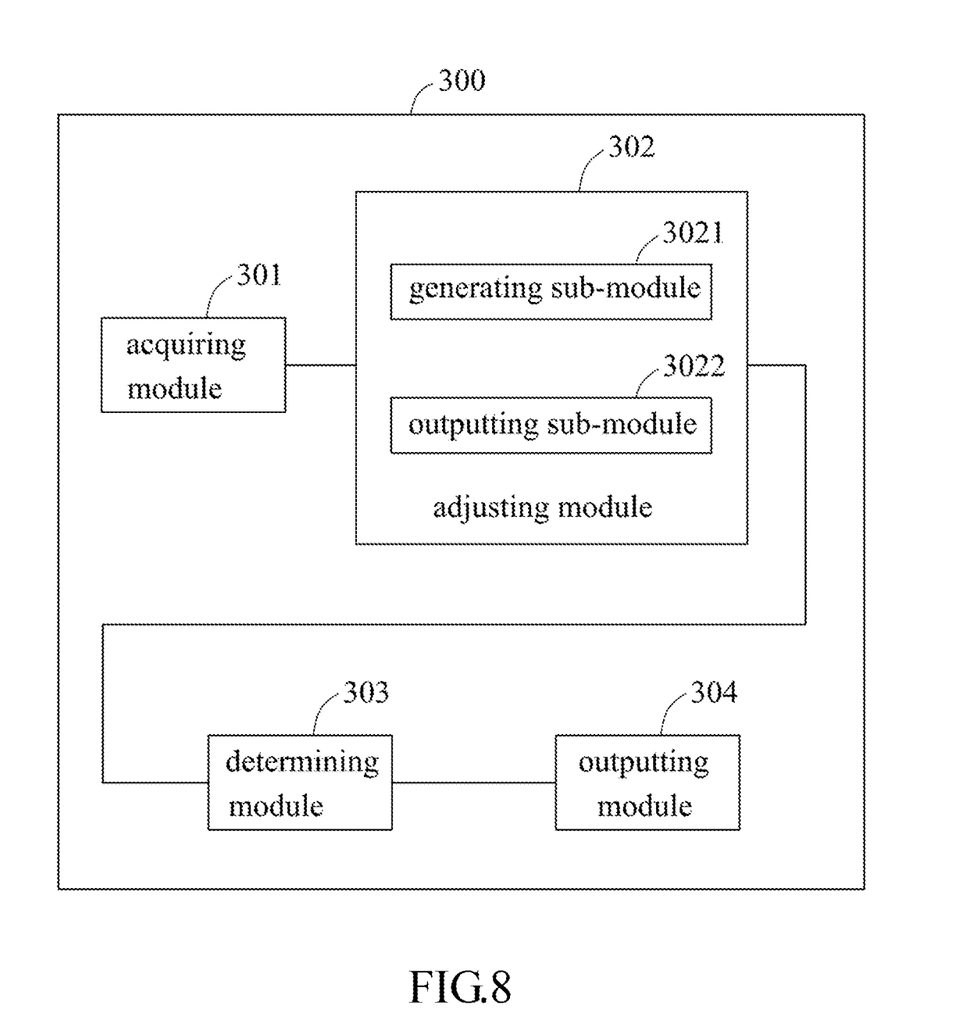
FIG. 8 is a schematic block diagram showing a wearable device provided by the embodiment of this disclosure.

As shown in FIG. 8, it is a schematic block diagram showing a wearable device provided by the embodiment of this disclosure. The wearable device and the 3D display device establish the communication connection to constitute the 3D display system. The wearable device may be, for example, polarized 3D glasses. The 3D display device may be, for example, a stereoscopic curved display device, and the curvature is adjustable. The 3D display system is used to display 3D images. As shown in FIG. 8, a wearable device 300 includes an acquiring module 301, an adjusting module 302, a determining module 303 and an outputting module 304.

When the 3D display device is turned on, the acquiring module 301 is used to acquire the curvature information of the 3D display device.

In an embodiment of this disclosure, after the 3D display device is booted up, the wearable device and the 3D display device establish a wireless communication connection, such as a WIFI connection, a Bluetooth connection or the like. After the connection is established, the wearable device receives the curvature information of the 3D display device, and the curvature information includes a specific value of the curvature the 3D display device.

It is to be noted that the curvature information of the 3D display device may be pre-stored, or, when the curvature of the 3D display device changes, the 3D display device may sense and acquire the changed curvature information.

The adjusting module 302 is used to adjust the curvature of the wearable device according to the curvature information.

In an embodiment of this disclosure, the curvature of the wearable device is adjusted according to the curvature of the 3D display device. Specifically, the curvature value of the lens of the wearable device is adjusted, so that the curvature of the wearable device and the curvature of the 3D display device match each other.

Said adjusting include, but not being limited to, an automatic adjustment method and a manual adjustment method. The automatic adjustment method is that the wearable device adjusts the curvature value of its own lens according to the curvature information. The manual adjustment method is that the curvature information is presented to the user, and the user manually adjusts the curvature value of the lens of wearable device according to the curvature information.

The wearable device is provided with a manual adjusting knob and a screen to help the user to do the manual adjustment. Based on the manual adjustment method, the adjusting module 302 includes a generating sub-module 3021 and an outputting sub-module 3022. The generating sub-module 3021 is used to generate prompt information according to the curvature information, and the outputting sub-module 3022 is used to output the prompt information to notify a user to adjust the curvature of the wearable device according to the curvature information. Specifically, the prompt information is displayed by the screen, and the user adjusts the curvature of the wearable device through the adjusting knob after seeing the prompt information.

The determining module 303 is used to determine whether an adjusted curvature of the wearable device and the curvature of the 3D display device satisfy a predetermined relationship.

In an embodiment of this disclosure, the predetermined relationship means that the curvature of the wearable device and the curvature of the 3D display device satisfy the predetermined condition, such as, the condition corresponding to the predetermined range, or the condition where both of them are the same.

The determining module 303 is specifically used for determining whether the adjusted curvature of the wearable device is the same as the curvature of the 3D display device. If the adjusted curvature of the wearable device and the curvature of the 3D display device are the same, then the adjusted curvature of the wearable device and the curvature of the 3D display device are determined to be satisfied the predetermined relationship.

When the determining module 303 determines that the adjusted curvature of the wearable device and the curvature of the 3D display device satisfy the predetermined relationship, the outputting module 304 is adopted. When the determining module 303 determines that the adjusted curvature of the wearable device and the curvature of the 3D display device do not satisfy the predetermined relationship, the adjusting module 302 is adopted to continue to adjust the curvature of the wearable device. Hence, the curvature of the wearable device satisfies the predetermined relationship.

When the adjusted curvature of the wearable device and the curvature of the 3D display device satisfy the predetermined relationship, then the outputting module 304 is used to output a control signal to the 3D display device to control the 3D display device to display a stereoscopic image.

In an embodiment of this disclosure, after the control signal is generated by the wearable device, the control signal is sent to the 3D display device, the 3D display device controls it to display the stereoscopic image according to the control signal. Hence, the user watches the 3D image, such as a 3D movie, through the 3D display device and the wearable device. The curvature of the wearable device and the curvature of the 3D display device are the same, and the phase delays generated after passing through the 3D display device 20 and the wearable device 10 are the same or similar when the 3D image displayed by the 3D display device reaches the human eyes after passing through the wearable device. So, the problem of crosstalk of the stereoscopic display at the large viewing angle can be effectively solved, and the user's video viewing experience can be thus enhanced.

Figure 9:
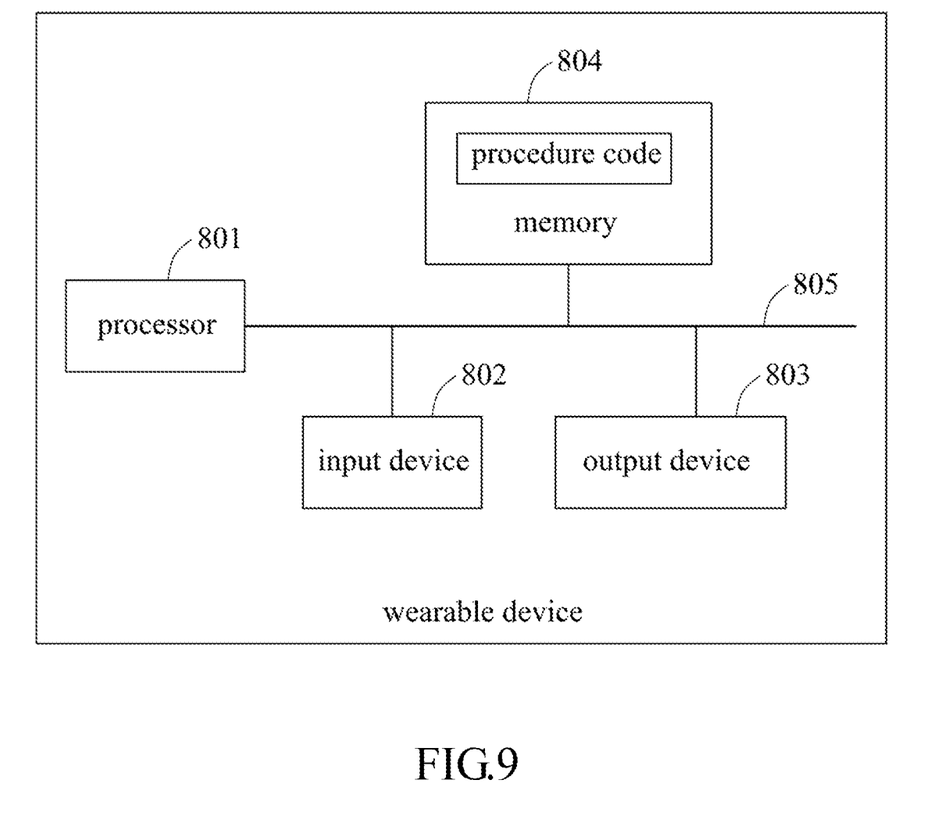
FIG. 9 is a schematic block diagram showing a wearable device provided by another embodiment of this disclosure.

Referring to FIG. 9, it is a schematic block diagram showing a wearable device provided by another embodiment of this disclosure. As shown in FIG. 9, the wearable device in this embodiment may include: one or multiple processors 801, one or multiple input devices 802, one or multiple output devices 803, and a memory 804. The above-mentioned processor 801, input device 802, output apparatus 803 and memory 804 are coupled to one another through a bus 805. The memory 804 is used to store instructions, and the processor 801 is used to execute the instructions stored in the memory 804. The processor 801 is used to perform the following steps: acquiring curvature information of the 3D display device when the 3D display device is turned on; adjusting a curvature of the wearable device according to the curvature information; determining whether the adjusted curvature of the wearable device and a curvature of the 3D display device satisfy a predetermined relationship; outputting a control signal to the 3D display device to control the 3D display device to display a 3D image when the adjusted curvature of the wearable device and the curvature of the 3D display device satisfy the predetermined relationship.

Specifically, the processor 801 is used to perform the following steps: determining whether the adjusted curvature of the wearable device is the same as the curvature of the 3D display device; when the adjusted curvature of the wearable device and the curvature of the 3D display device are the same, then the adjusted curvature of the wearable device and the curvature of the 3D display device are determined to be satisfied the predetermined relationship.

Specifically, the processor 801 is used to perform the following steps: generating a prompt information according to the curvature information; outputting the prompt information to notify a user to adjust the curvature of the wearable device according to the curvature information.

It should be understood that in the embodiment of this disclosure, the so-called processor 801 may be a central processing unit (CPU). The processor may also be other general purpose processors, digital signal processors (DSPs), application specific integrated circuits (ASICs), field-programmable gate array (FPGA) or other programmable logic devices, discrete door or transistor logic devices, discrete hardware elements and the like. The general purpose processor may be a microprocessor, or the processor may also be any conventional processor or the like.

The input device 802 may include a touch pad, a fingerprint sensor (used to collect the user's fingerprint information and direction information of the fingerprint) and the like, and the output apparatus 803 may include a display (LCD) and the like.

The memory 804 may include a read-only memory and a random access memory, and provides the instructions and data to the processor 801. A portion of the memory 804 may also include a non-volatile random access memory. For example, the memory 804 may also store the device type information.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A 3D image displaying method used with a 3D display system, the 3D display system comprising a wearable device and a 3D display device, the 3D image displaying method comprising:
   acquiring a curvature information of the 3D display device when the 3D display device is turned on;
   adjusting a curvature of the wearable device according to the curvature information;
   determining whether the adjusted curvature of the wearable device and the curvature of the 3D display device satisfy a predetermined relationship; and
   sending a control signal to the 3D display device to control the 3D display device to display a 3D image when the adjusted curvature of the wearable device and the curvature of the 3D display device satisfy the predetermined relationship,
   wherein during determining whether the adjusted curvature of the wearable device and the curvature of the 3D display device satisfy the predetermined relationship, the method comprises;

determining whether the adjusted curvature of the wearable device is the same as the curvature of the 3D display device; and determining that the adjusted curvature of the wearable device and the curvature of the 3D display device satisfy the predetermined relationship when the adjusted curvature of the wearable device and the curvature of the 3D display device are the same.

2. The 3D image displaying method according to claim 1, wherein during adjusting the curvature of the wearable device according to the curvature information, the method comprises:

generating a prompt information according to the curvature information; and outputting the prompt information to notify a user to adjust the curvature of the wearable device according to the curvature information.

3. The 3D image displaying method according to claim 1, wherein after the 3D display device is booted up, the wearable device and the 3D display device establish a wireless communication connection.

4. The 3D image displaying method according to claim 1, wherein the curvature information of the 3D display device is pre-stored, or when the curvature of the 3D display device changes, the 3D display device senses and acquires the changed curvature information.

5. The 3D image displaying method according to claim 1, wherein during adjusting the curvature of the wearable device according to the curvature information, the method comprises:

generating a prompt information according to the curvature information; and outputting the prompt information to notify a user to adjust the curvature of the wearable device according to the curvature information.

6. The 3D image displaying method according to claim 5, wherein during adjusting the curvature of the wearable device according to the curvature information, the method comprises: manually adjusting the curvature value of the lens of the wearable device according to the curvature information by a user.

* * * * *